United States Patent
Murray et al.

(10) Patent No.: US 10,300,492 B2
(45) Date of Patent: May 28, 2019

(54) METHOD FOR MECHANICAL EXFOLIATION OF PARTICULATE MATERIALS

(71) Applicant: XG SCIENCES, INC., Lansing, MI (US)

(72) Inventors: Scott L. Murray, East Lansing, MI (US); Jim L. Peyton, Richmond, KY (US); Korey Morris, Lexington, KY (US)

(73) Assignee: XG SCIENCES, INC., Lansing, MI (US)

( * ) Notice: Subject to any disclaimer, the term of this patent is extended or adjusted under 35 U.S.C. 154(b) by 415 days.

(21) Appl. No.: 15/013,028

(22) Filed: Feb. 2, 2016

(65) Prior Publication Data

US 2016/0151786 A1 Jun. 2, 2016

Related U.S. Application Data

(62) Division of application No. 14/931,236, filed on Nov. 3, 2015, which is a division of application No.
(Continued)

(51) Int. Cl.
*B01F 11/00* (2006.01)
*C01B 32/225* (2017.01)
(Continued)

(52) U.S. Cl.
CPC .......... *B02C 17/14* (2013.01); *B01F 11/0008* (2013.01); *B02C 17/186* (2013.01);
(Continued)

(58) Field of Classification Search
CPC ......... B02C 17/04; B02C 17/14; B02C 17/24; B02C 19/16; B02C 17/186;
(Continued)

(56) References Cited

U.S. PATENT DOCUMENTS 3,763,717 A 10/1973 Lenoir et al.
3,764,112 A 10/1973 Jelley
(Continued)

FOREIGN PATENT DOCUMENTS

CN 2104705 U 5/1992
CN 2629824 Y 8/2004
(Continued)

OTHER PUBLICATIONS

Schinwald, A. et al., "Graphene-Based Nanoplatelets: A New Risk to the Respiratory System as a Consequence of Their Unusual Aerodynamic Properties", ACS Nano, Published Online: Dec. 23, 2011, pp. 736-746, vol. 6, Issue 1, © 2011 American Chemical Society; DOI: 10.1021/nn204229f.
(Continued)

*Primary Examiner* — Charles Cooley
(74) *Attorney, Agent, or Firm* — Avery N. Goldstein; Blue Filament Law PLLC

(57) ABSTRACT

Apparatus and system of components to mechanically exfoliate particulate materials using a multi-axis approach to deliver predetermined forces to a particulate material, including containers to hold particulate material and media, also including media, and, the associated parameters for operating such equipment along with methods and compositions provided by the apparatus and methods.

14 Claims, 18 Drawing Sheets

Related U.S. Application Data

13/435,260, filed on Mar. 30, 2012, now Pat. No. 9,206,051.

(51) Int. Cl.

| | | |
|---|---|---|
| *C01B 32/182* | (2017.01) | |
| *F16H 55/17* | (2006.01) | |
| *F16H 53/02* | (2006.01) | |
| *F16H 53/00* | (2006.01) | |
| *F16H 37/06* | (2006.01) | |
| *C01B 32/19* | (2017.01) | |
| *B82Y 40/00* | (2011.01) | |
| *B82Y 30/00* | (2011.01) | |
| *B02C 17/24* | (2006.01) | |
| *B02C 17/18* | (2006.01) | |
| *B02C 17/14* | (2006.01) | |
| *F16H 1/22* | (2006.01) | |
| *F16H 1/20* | (2006.01) | |
| *F16C 3/02* | (2006.01) | |

(52) U.S. Cl.
CPC ............ *B02C 17/24* (2013.01); *B82Y 30/00* (2013.01); *B82Y 40/00* (2013.01); *C01B 32/182* (2017.08); *C01B 32/19* (2017.08); *C01B 32/225* (2017.08); *F16C 3/02* (2013.01); *F16H 1/20* (2013.01); *F16H 1/22* (2013.01); *F16H 37/065* (2013.01); *F16H 53/00* (2013.01); *F16H 53/02* (2013.01); *F16H 55/17* (2013.01); *B01F 11/0025* (2013.01); *B01F 11/0097* (2013.01); *C01B 2204/02* (2013.01); *C01B 2204/04* (2013.01); *C01B 2204/32* (2013.01); *C01P 2006/12* (2013.01); *F16H 2055/176* (2013.01); *Y10T 74/19051* (2015.01); *Y10T 74/1987* (2015.01); *Y10T 74/19949* (2015.01); *Y10T 74/2101* (2015.01); *Y10T 428/2991* (2015.01)

(58) Field of Classification Search
CPC ............ B01F 11/0025; B01F 11/0028; B01F 11/0062; B01F 11/0097; B01F 9/0005; B01F 11/0005; B01F 11/00; F16H 55/17; F16H 2055/176; F16H 1/22; F16H 37/065; F16H 53/00; F16H 1/20; F16H 53/02; C01B 31/0423; C01B 31/0438; C01B 31/0469; C01B 2204/02; C01B 2204/32; C01B 2204/04; F16C 3/02; B82Y 30/00; B82Y 40/00; Y10T 74/1987; Y10T 74/19949; Y10T 74/2101; Y10T 428/2991; Y10T 74/19051; C01P 2006/12
See application file for complete search history.

(56) References Cited

U.S. PATENT DOCUMENTS

| | | | |
|---|---|---|---|
| 4,183,678 A | 1/1980 | Ohno | |
| 4,197,708 A | 4/1980 | Milton, Jr. et al. | |
| 4,307,965 A | 12/1981 | Catarious et al. | |
| 4,337,000 A | 6/1982 | Lehmann | |
| 4,862,756 A | 9/1989 | Dutschke | |
| 5,314,125 A * | 5/1994 | Ohno | B02C 17/14 241/175 |
| 5,454,749 A * | 10/1995 | Ohno | B02C 17/14 451/32 |
| 5,501,522 A | 3/1996 | Tung | |
| 5,556,202 A | 9/1996 | Dorn | |
| 5,684,369 A * | 11/1997 | Kim | B23Q 3/1554 318/3 |
| 5,971,602 A | 10/1999 | Dorn | |
| 6,863,143 B2 * | 3/2005 | Ha | B60K 17/08 180/248 |
| 7,008,100 B2 * | 3/2006 | Sergio | B01F 11/0008 366/110 |
| 7,059,763 B2 | 6/2006 | Sordelli et al. | |
| 7,284,901 B2 | 10/2007 | Midas et al. | |
| 7,631,624 B2 * | 12/2009 | Pflug | F01L 1/02 123/90.16 |
| 7,780,339 B2 | 8/2010 | Johnson et al. | |
| 9,157,509 B2 * | 10/2015 | Lessard | F16H 1/20 |
| 9,206,051 B2 * | 12/2015 | Murray | B82Y 30/00 |
| 9,682,380 B2 * | 6/2017 | Murray | B82Y 30/00 |
| 10,081,018 B2 * | 9/2018 | Murray | B02C 17/24 |
| 2002/0145938 A1 | 10/2002 | Sasaki | |
| 2005/0126240 A1 | 6/2005 | Waldert et al. | |
| 2007/0017464 A1 | 1/2007 | Pflug et al. | |
| 2008/0197223 A1 | 8/2008 | Nagao | |
| 2008/0279756 A1 | 11/2008 | Zhamu et al. | |
| 2009/0117467 A1 | 5/2009 | Zhamu et al. | |
| 2010/0292043 A1 | 11/2010 | Tao et al. | |
| 2012/0201738 A1 * | 8/2012 | Kwon | B01J 6/004 423/415.1 |
| 2013/0260152 A1 * | 10/2013 | Murray | B82Y 30/00 428/403 |
| 2015/0101874 A1 | 4/2015 | Getta et al. | |
| 2016/0051989 A1 * | 2/2016 | Murray | B82Y 30/00 451/32 |
| 2016/0069444 A1 * | 3/2016 | Murray | B82Y 30/00 74/665 A |
| 2016/0138678 A1 * | 5/2016 | Murray | B82Y 30/00 74/665 F |
| 2016/0151786 A1 * | 6/2016 | Murray | B82Y 30/00 451/32 |
| 2016/0152478 A1 * | 6/2016 | Murray | B82Y 30/00 428/402 |
| 2016/0167055 A1 * | 6/2016 | Murray | B82Y 30/00 428/402 |
| 2016/0199845 A1 * | 7/2016 | Murray | B82Y 30/00 451/32 |
| 2016/0201784 A1 * | 7/2016 | Murray | B82Y 30/00 74/434 |
| 2017/0200938 A1 | 7/2017 | Zhamu et al. | |

FOREIGN PATENT DOCUMENTS

| | | |
|---|---|---|
| CN | 101385989 A | 3/2009 |
| CN | 202105690 U | 1/2012 |
| DE | 102014214743 A1 | 1/2016 |
| EP | 0077162 A2 | 4/1983 |
| FR | 846387 A | 9/1939 |
| FR | 2899129 A3 | 10/2007 |
| FR | 2899130 A3 | 10/2007 |
| GB | 860493 A | 2/1961 |
| GB | 1131097 A | 10/1968 |
| GB | 1506977 A | 4/1978 |
| JP | 2007090190 A | 4/2007 |
| KR | 20110016420 A | 2/2011 |
| SU | 1007715 A1 | 3/1983 |
| SU | 1098558 A1 | 6/1984 |
| WO | 9702089 A1 | 1/1997 |
| WO | 0071258 A1 | 11/2000 |
| WO | 2011006814 A1 | 1/2011 |

OTHER PUBLICATIONS

International Search Report dated Nov. 5, 2013 for International Application No. PCT/US2013/032741 filed Mar. 18, 2013.
English translation of Chinese Search Report for Chinese Application No. 201610297469.5 filed Mar. 18, 2013.
Supplementary European Search Report dated Jan. 25, 2016 for European Application No. 13770399 filed Mar. 18, 2013.

\* cited by examiner

METHOD FOR MECHANICAL EXFOLIATION OF PARTICULATE MATERIALS

This application is a divisional application from U.S. patent application Ser. No. 14/931,236, filed Nov. 3, 2015, currently pending, which is a divisional application of Ser. No. 13/435,260, filed Mar. 30, 2012, currently pending, from which priority is claimed.

BACKGROUND OF THE INVENTION

There are several inventions and efforts to produce graphene chemically, thermally, and mechanically. Exfoliation involves the removal of the layers on the graphite's outermost surface. Ball milling is the most used of these methods, and this method involves milling the graphene in a closed container using various milling media. The ball mill moves in only one direction, that is, rotational on a horizontal axis. Prior art methods have described the results, however, they have failed to describe the specific mechanical forces in type and size, and the system of components required for success.

The applicant is aware of WO2011006814 that deals with a wet process for providing particulate materials.

BRIEF DESCRIPTION OF THE INVENTION

The instant invention, in one embodiment, deals with an apparatus that includes a system of components to mechanically exfoliate particulate materials using a multi-axis approach. In this embodiment, layers of particulate material or multilayer material are removed via a controlled shear by using a mechanical movement.

The apparatus of this invention includes a machine to deliver forces, containers to hold particulate material and media, the media, and the associated parameters for operating such equipment along with, methods and compositions provided by the apparatus and methods.

Thus, what is claimed in one embodiment, is an apparatus for mechanically exfoliating particulate material with a basil plane, said apparatus comprising in combination a support frame, a motor mount, a motor mounted on the motor mount, the motor having a drive shaft, wherein the drive shaft has a driven flywheel mounted on it.

The support frame has a non-stationary plate surmounted on it by mounted shock absorbers. The non-stationary plate has a front end and a back end, and it has a non-stationary plate rigidly surmounted on it.

There is a processor assembly comprising a main drive shaft having two ends extending through drive shaft mounts, the main drive shaft comprising a flywheel between the ends of the main drive shaft.

There is one or more cams on the main drive shaft, and a fastening means on each end of the main drive shaft to maintain the main drive shaft in the drive shaft mounts.

There is a canister carrier mounted on each cam, the canister carrier comprising a hub, wherein the hub has an external surface mounted cradle and an internal flat surface supporting bearings.

There is a stabilizer drive mechanism, the stabilizer drive mechanism comprising a ring gear driven by a pinion gear, a secondary drive shaft surmounted on the non-stationary flat plate. The secondary drive shaft is mounted in secondary drive shaft mounts and surmounted on the non-stationary flat plate.

The secondary drive shaft has at least three first drive wheels. There is a drive link connecting each first drive wheel with an aligned second drive wheel.

In addition there is an embodiment which is an apparatus for mechanically exfoliating particulate material, the apparatus comprising in combination a support frame. The support frame is comprised, of an upper bar frame and a lower bar frame, wherein the upper bar frame and lower bar frame are supported by vertical legs. The upper bar frame and lower bar frame are parallel and spaced apart from each other.

There is a motor mount mounted on and supported by the lower bar frame and there is a motor mounted on said motor mount, the motor having a drive shaft and the drive shaft having a driven flywheel mounted on it.

The upper bar frame has a non-stationary plate surmounted thereon by at least four corner mounted shock absorbing mounts. The non-stationary plate has a front end and a back end. The non-stationary plate has rigidly surmounted on it, drive shaft mounts. The non-stationary plate has two large openings on either side of a smaller centered opening and the drive shaft mounts are located on the outside edges of the large openings.

There is a processor assembly comprising: a main drive shaft having two ends extending through ail drive shaft mounts. The main drive shaft comprises a flywheel centered between the ends of the main drive shaft. There are two cams, each centered between the flywheel and an end of the main drive shaft, and a fastening means on each end of the main drive shaft to maintain the main drive shaft in the drive shaft mounts.

There is a canister carrier mounted on each cam, the canister carrier comprising: a hub, wherein the hub has an external surface mounted cradle and an internal flat surface supporting bearings, there being mounted on an outside hub, a drive component such as a stabilizer ring gear. There is rotatably mounted on the main drive shaft, adjacent to the stabilizer ring gear, a stabilizer housing, the stabilizer housing containing internal bearings adjacent to the main drive shaft, wherein there is a stabilizer pinion gear surrounding the stabilizer housing and meshing with the stabilizer ring gear.

There is a stabilizer drive mechanism, the stabilizer drive mechanism comprising a secondary drive shaft surmounted on the non-stationary flat plate near the backend. The secondary drive shaft is mounted in secondary drive shaft mounts, surmounted on the non-stationary flat plate. The secondary drive shaft has at least three first drive wheels, one each near an end of the secondary drive shaft and one centered on the secondary drive shaft.

The main drive shaft has at least three second drive wheels, each being aligned with second end first drive wheels on the secondary drive shaft, the centered first drive wheel being aligned with a third drive wheel mounted on a gear reducer. The gear reducer is surmounted on the non-stationary flat plate between the flywheel and the secondary shaft. The gear reducer has a fourth drive wheel mechanically connected to a third drive wheel by reducing gears, the fourth drive wheel and centered first drive wheel are connected by a drive link, the drive link connecting each of the first drive wheel with an aligned second drive wheel.

In another embodiment, there is an apparatus for mechanically exfoliating particulate material, the apparatus comprising in combination: a support frame. The support frame is comprised of an upper bar frame and a lower bar frame, wherein the upper bar frame and lower bar frame are supported by vertical legs. The upper bar frame and lower bar frame are parallel and spaced apart from each other.

There is a motor mount mounted on and supported by the lower bar frame and there is a motor mounted on said motor mount, the motor having a drive shaft and the drive shaft having a driven flywheel mounted on it.

The upper bar frame has a non-stationary plate surmounted thereon by at least four corner mounted shock absorbing mounts. The non-stationary plate has a front end and a back end. The non-stationary plate has rigidly surmounted on it, drive shaft mounts. The non-stationary plate has two large openings on either side of a smaller centered opening and the drive shaft mounts are located on outside edges of the large openings.

There is a processor assembly comprising: a main drive shaft having two ends extending through all drive shaft mounts. The main drive shaft comprises a flywheel centered between the ends of the main drive shaft. There are two cams, each centered between the flywheel and an end of the main drive shaft, and a fastening means on each end of the main drive shaft to maintain the main drive shaft in the drive shaft mounts.

There is a canister carrier mounted on each cam, the canister carrier comprising: a hub, wherein the hub has an external surface mounted cradle and an internal flat surface supporting bearings, there being mounted on an outside hub, a stabilizer ring gear. There is rotatably mounted on the main drive shaft, adjacent to the first stabilizer wheel, a stabilizer housing, the stabilizer housing containing internal bearings adjacent to the main drive shaft, wherein there is a second stabilizer wheel surrounding the stabilizer housing and meshing with the first stabilizer wheel.

There is a stabilizer drive mechanism, the stabilizer drive mechanism comprising a secondary drive shaft surmounted on the non-stationary flat plate near the backend. The secondary drive shaft is mounted in secondary drive shaft mounts, surmounted on the non-stationary flat plate. The secondary drive shaft has at least three first drive wheels, one each near an end of the secondary drive shaft and one centered on the secondary drive shaft.

The main drive shaft has at least three second drive wheels, each being aligned with second end first drive wheels on the secondary drive shaft, the centered first drive wheel being aligned with a third drive wheel mounted on a gear reducer. The gear reducer is surmounted on the non-stationary flat plate between the flywheel and the secondary shaft. The gear reducer has a fourth drive wheel mechanically connected to a third drive wheel by reducing gears, the fourth drive wheel and centered first drive wheel are connected by a drive link, the drive link connecting each of the first drive wheel with an aligned second drive wheel.

In yet another embodiment, there is a drive shaft. The drive shaft is integral and comprises a linear shaft having two terminal ends and a center point. The linear shaft has fixedly mounted at the center point, a flywheel. There are two cams, each cam having a near end and a distal end. Each cam has an opening through it whereby the opening begins at the near end near a bottom edge of the cam, and terminates through the distal end near a top edge. The linear shaft extends through the opening in the cam and extends beyond the distal end of the cam. The drive shaft has mounted on it, a wheel drive adjacent to the flywheel.

In still another embodiment of this invention there is a ring gear. The ring gear comprises: an inside surface and an outside surface, the inward surface is comprised of a plurality of gear teeth, the number and shape of gear teeth being matched to mesh with a corresponding gear on an adjacent pinion gear.

A further embodiment is a cam assembly comprising a cylindrical housing. The cylindrical housing has a near end and a distal end and an opening extending from the near end through the distal end. The opening begins at the near end of the cam and near a bottom edge and terminates through the distal end near a top edge, the distal end having an off round, at least one said end cap having a valve inserted therein Yet another embodiment is a carrier assembly for canisters. The carrier assembly comprises a hubbed housing having an open center through it with an internal surface. The hub has at least two bearings mounted on the internal surface of the housing and internal to each hub. The hubs support an integral canister cradle attached to the hubs. One hub has a stabilizer ring gear fixedly attached thereto such that the gear face of the gear faces away from the hub.

In yet another embodiment, there is in combination a carrier assembly and at least one canister.

There is a canister embodiment, the canister comprising: a hollow cylinder having two terminal ends, each of the terminal ends having a sealable cap mounted thereon. There is at least one end cap having a valve inserted therein.

SUMMARY DESCRIPTION OF THE DRAWINGS

DETAILED DESCRIPTION OF THE INVENTION

Figure 1:
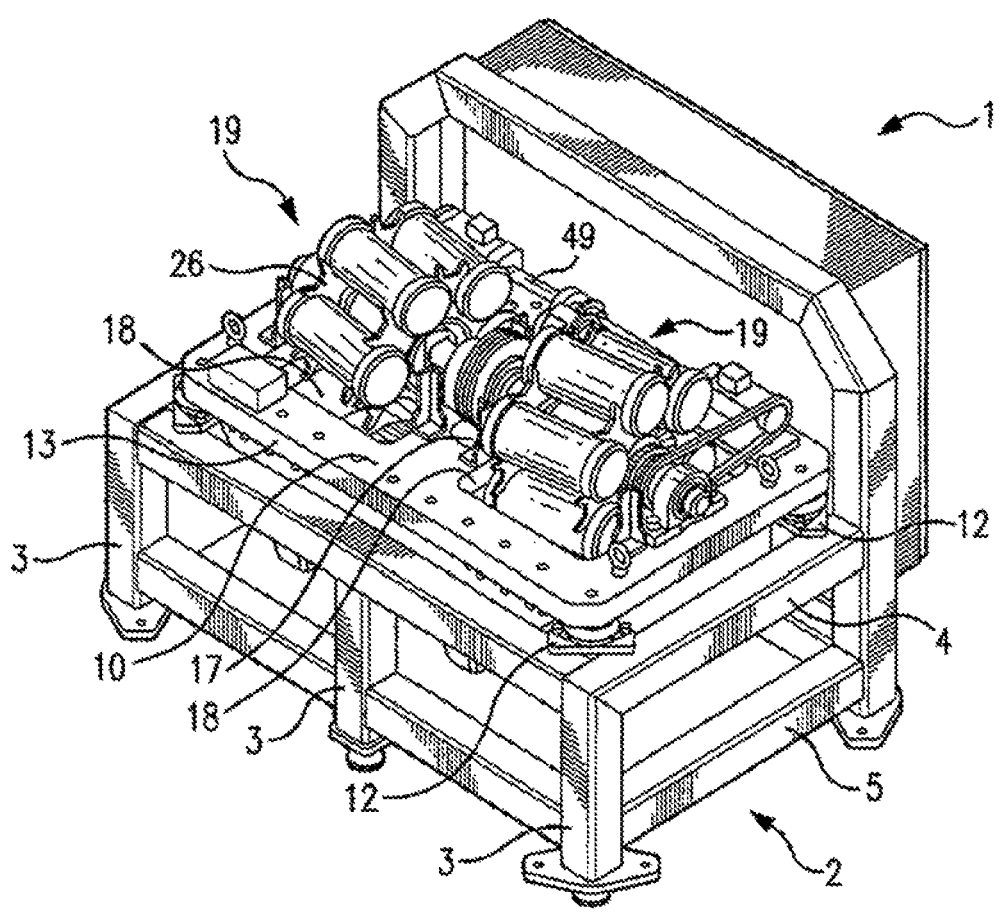
FIG. 1 is a top view in perspective of the apparatus of this invention.
Figure 2:
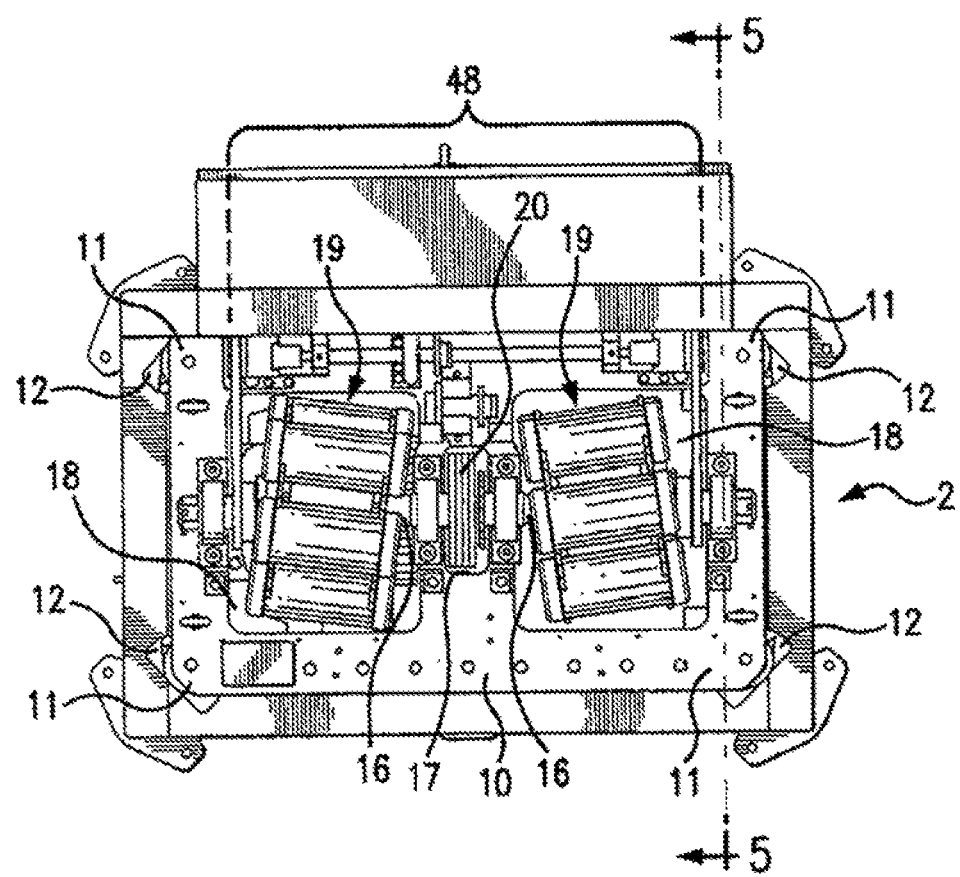
FIG. 2 is a full top view of the apparatus of this invention.
Figure 3:
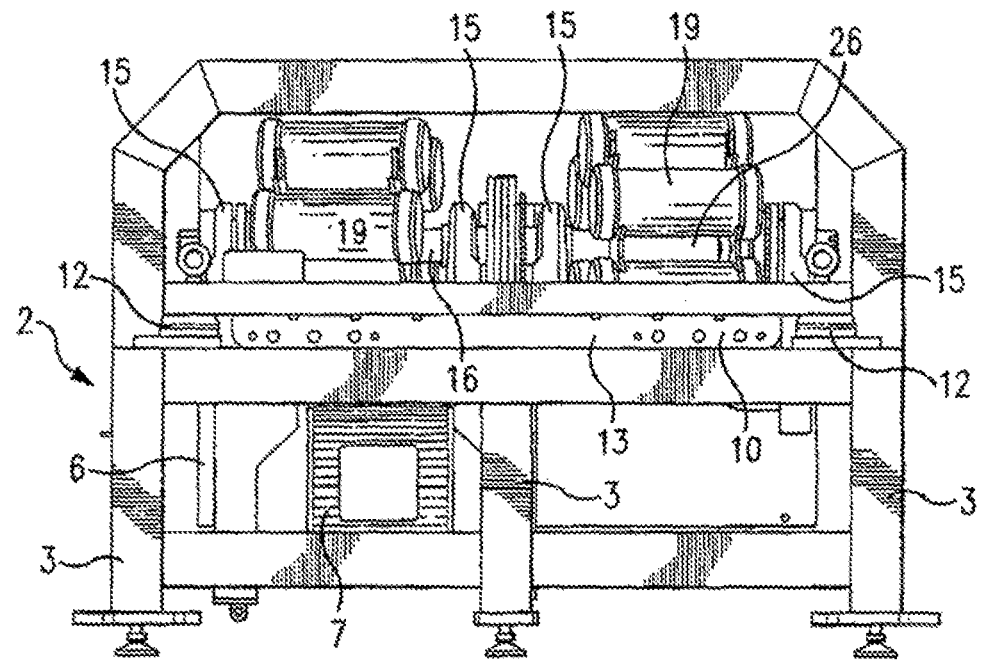
FIG. 3 is a full front view of the apparatus of this invention.
Figure 4:
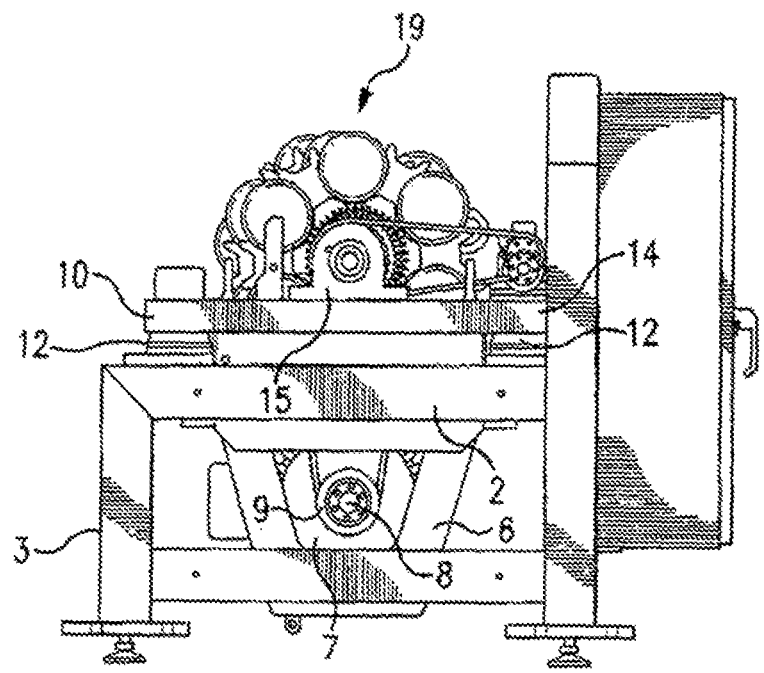
FIG. 4 is a full end view of the apparatus of this invention from the end opposite the motor.

Turning now to FIG. 1, there is shown a full top view in perspective of the apparatus 1 of this invention. FIG. 2 is a full top view of the apparatus, FIG. 3 is a full front view of the apparatus, and FIG. 4 is a full end view of the apparatus of this invention from the end opposite of the motor mounting. The Figures should be consulted for an understanding of the information that follows.

In FIGS. 1, 2, 3, and 4, there is shown a framework 2 for supporting the working components of this invention and thus there is shown the legs 3 of the framework 2, the upper bar frame 4, and a lower bar frame 5.

Figure 5:
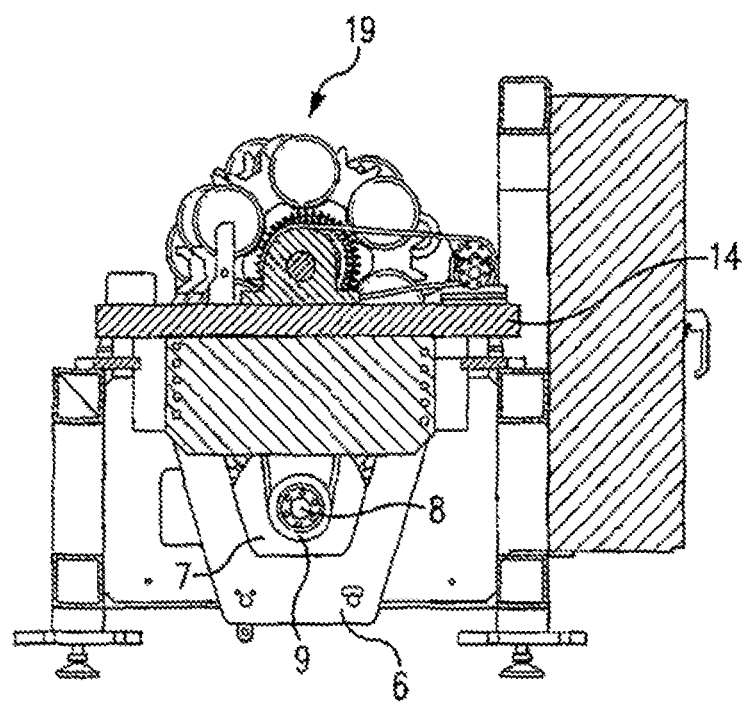
FIG. 5 is a full end view of the apparatus of this invention from the motor mount end along line 5-5 in FIG. 2.

With reference to FIG. 5, there is shown a motor mount 6, mounted on the lower bar from 5, on which there is mounted a motor 7, also shown in FIG. 3 more clearly. The motor 7 is the main drive mechanism for the apparatus 1. The motor has a motor drive shaft 8, shown in FIG. 4, and attached to this drive shaft 8 is a driven flywheel 9.

As shown clearly in FIGS. 1, 2, and 3, the upper bar frame 4 has a non-stationary flat plate 10 surmounted on it which is supported at least at each of the four corners 11, by shock absorbing mounts 12. The non-stationary flat plate 10 has a front end 13 and a back end 14 (shown in FIG. 5). Rigidly mounted on the flat plate 10 are drive shaft mounts 15, which hold the main drive shaft 16 which will be discussed in detail infra. The drive shaft mounts 15 are located on either side of a small opening discussed infra and on either side of the two larger openings 18, also discussed infra.

The flat plate 10 has a centered small opening 17 and two larger openings 18 on either side of the centered small opening 17. Located in the two large openings 18 are processor assemblies 19, both processor assemblies being supported and driven by the main drive shaft 16, which extends from the drive shaft mount 15 on one edge of the flat plate 10 to the drive shaft mount 15 on the opposite edge of the flat plate 10.

There is centered on the main drive shaft 16, a main flywheel 20, which main flywheel 20 is essentially suspended by the main drive shaft 16 in the small opening 17. Thus, the processor assemblies 19 consist of the main drive shaft 16 and the main flywheel 20.

Figure 6:
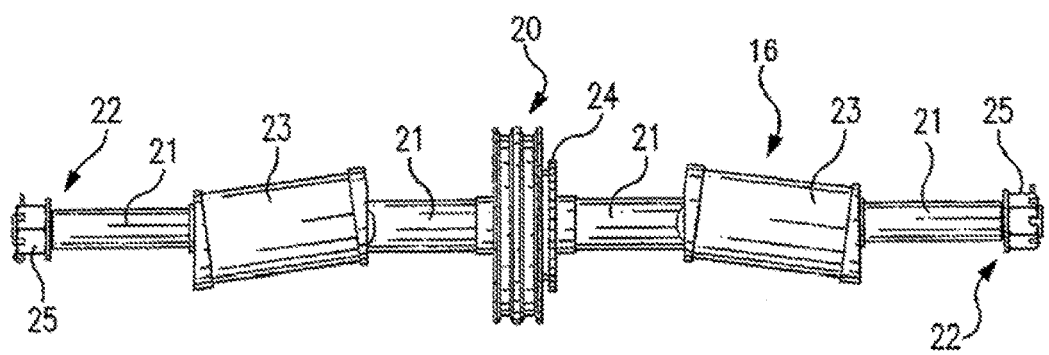
FIG. 6 is a full side view of a main drive shaft of this invention with its component parts.
Figure 7:
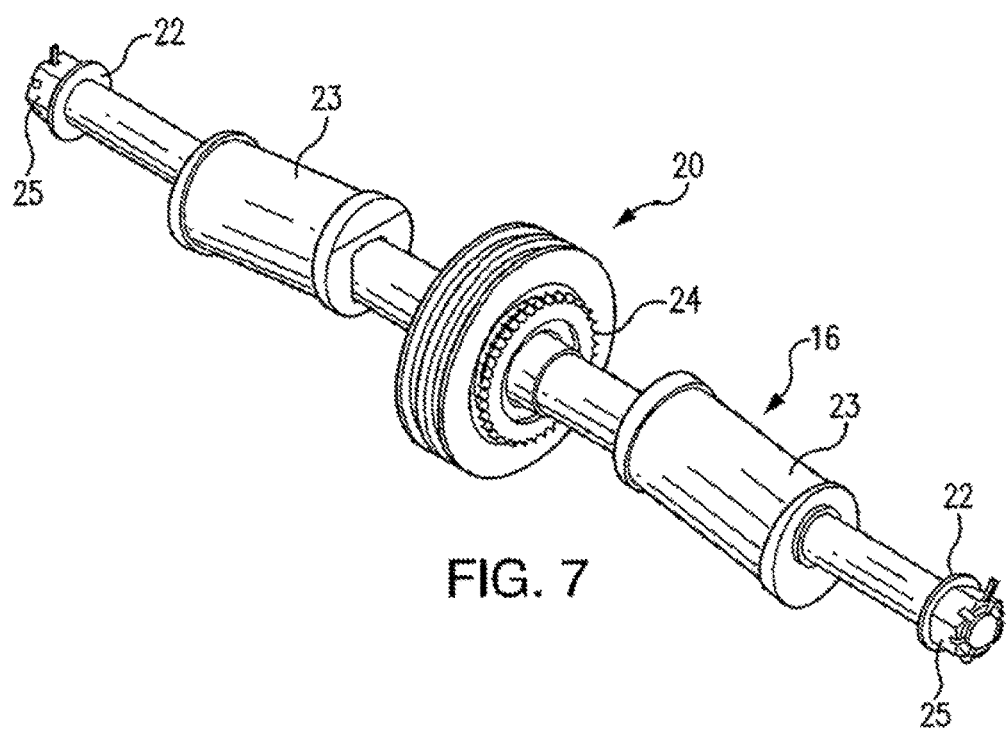
FIG. 7 is a view in perspective of the main drive shaft of FIG. 6.
Figure 9:
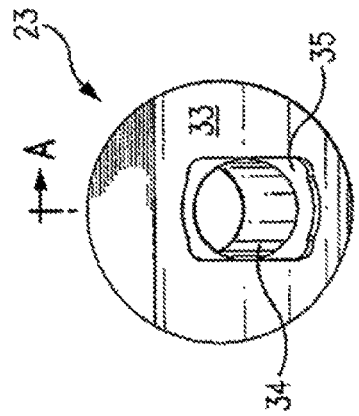
FIG. 9 is a full end view of a cam of this invention showing the rectangular inset and opening therethrough.
Figure 11:
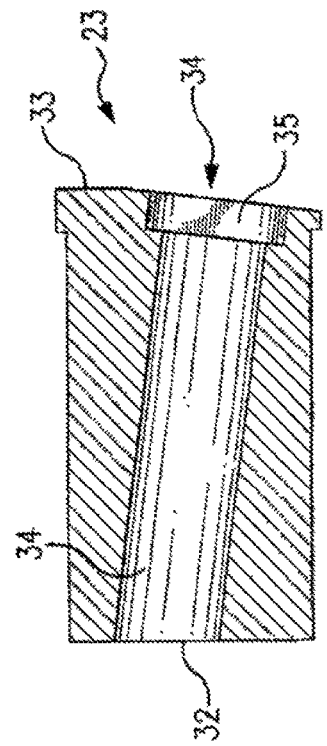
FIG. 11 is a cross sectional view of the cam of FIG. 9, through line 11-11 of FIG. 9.

Turning now to FIGS. 6 and 7, there is shown the details of the main drive shaft 16. FIG. 6 is a full side view and FIG. 7 is a full view in perspective. The main drive shaft consists of a straight shaft 21 on which are mounted the main flywheel 20, centered between the ends 22 of the straight shaft 21, two cams 23 each spaced essentially equidistant between the main flywheel 20 and the ends 22 of the straight shaft 21. Also shown are the fasteners 25 for fastening the main drive shaft 16 in the drive shaft mounts 15 (not shown in FIGS. 6 and 7). One preferred drive mechanism for the main drive shaft is shown as a chain sprocket 24.

Figure 8:
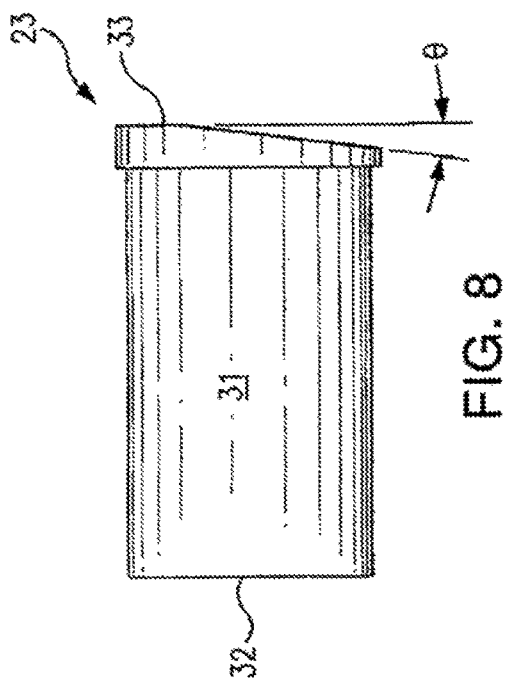
FIG. 8 is a full side view of a cam of this invention.
Figure 10:
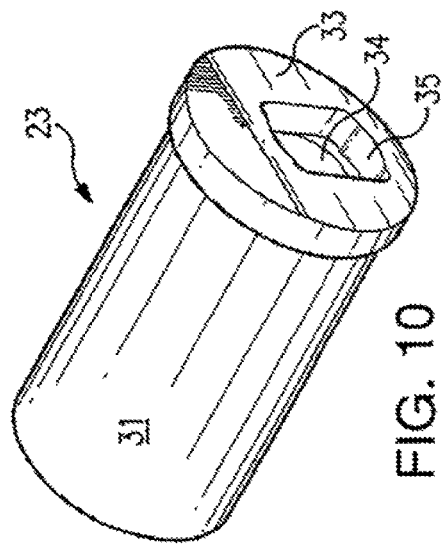
FIG. 10 is a view in perspective of the cam of FIG. 8.
Figure 12:
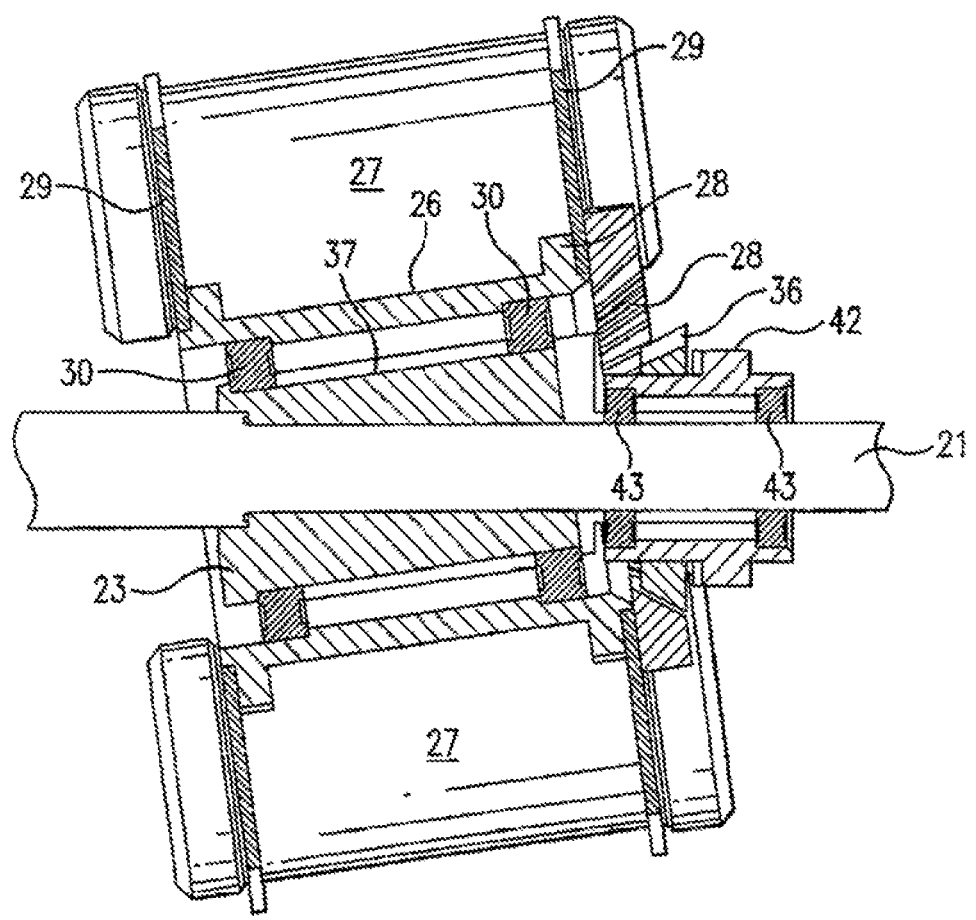
FIG. 12 is a partial cross section of the canister carrier mounted on a cam along line 12-12 of FIG. 13.
Figure 13:
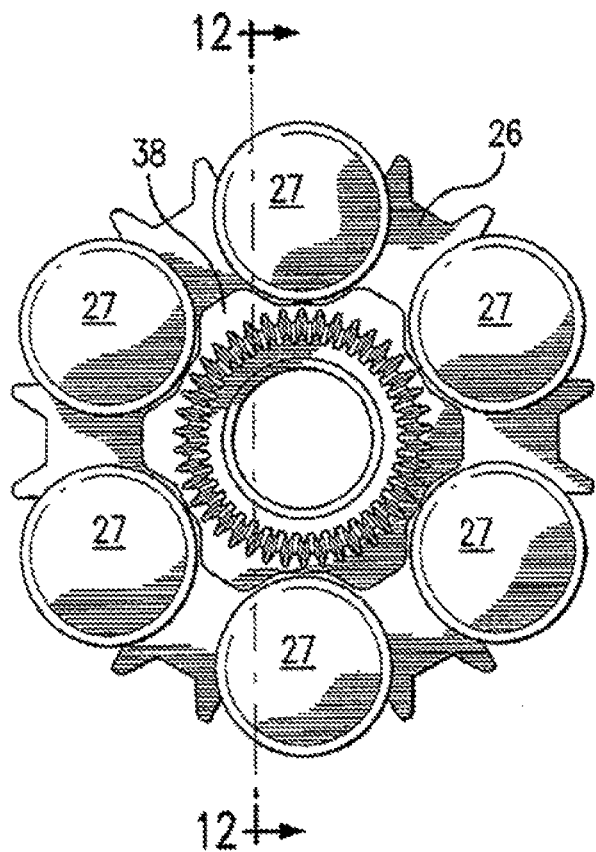
FIG. 13 is an end view of a canister carrier showing the canister cradle mounted with canisters and an end view of a ring gear.
Figure 14:
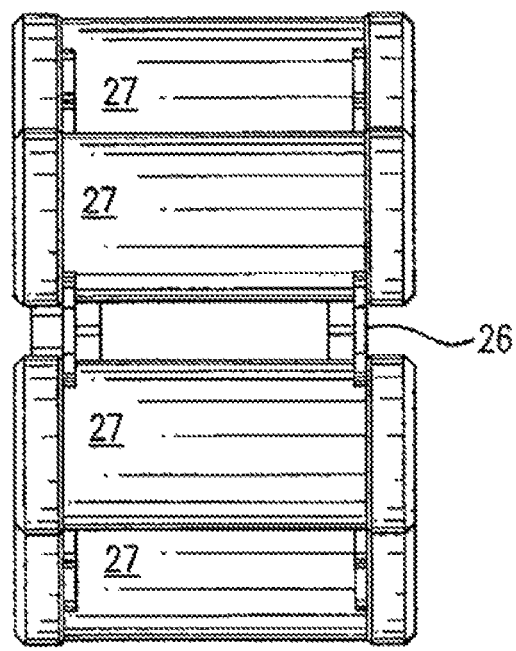
FIG. 14 is a full side view of the canister carrier of FIG. 13.
Figure 15:
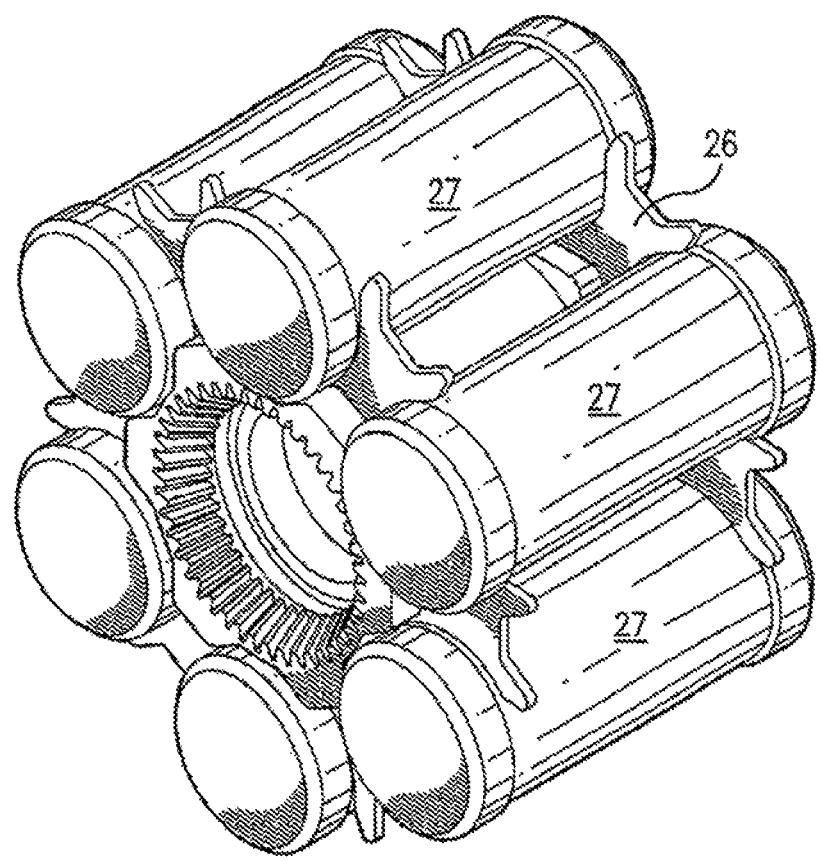
FIG. 15 is a view in perspective of the canister carrier of FIG. 13.

The cams 23 are shown in detail in FIGS. 8, 9, 10, and 11. The cam comprises a solid cylinder 31, that has one flat end 32 and the opposite end 33 configured at a slight angle θ from the vertical, said angle θ comprising less than about 15°. (FIG. 8 is a full side view of the cam 23 of this invention). It should be noted that end 33 also has a slight hub associated with that end. In observing FIGS. 9 and 10, there is shown an opening 34, which is rectangular in configuration, through which the straight shaft 21 of the main drive shaft 16 extends. Note from FIG. 11, that the opening 34 has an inset 35, and that the remainder of the opening 34 is angled through the cam 23. By this means, the straight shaft 21, when the main drive shaft 16 turns, causes the canister carrier 26 attached to it to move in an irregular motion as will be described in detail infra.

There is a canister carrier 26 mounted on each cam 23 (see FIGS. 12, 13, 14, 15, and 16. The canister carrier 26 can carry one or more canisters 27 as shown in FIGS. 13, 14, 15, and 16. As the cams 23 move, the canister carriers 26 move. The canister carriers 26 have an outside hub 28 (FIG. 12), wherein the outside hub 28 has an external surface mounted cradle 29. The outside hub 28 has an internal flat surface 37 supporting bearings 30.

The canisters can be fabricated from any material that will sustain the forces and not contaminate the material in the canister. Such useable materials include, for example, stainless steel, plated steel, polycarbonate, aluminum and titanium, among others.

Figure 16:
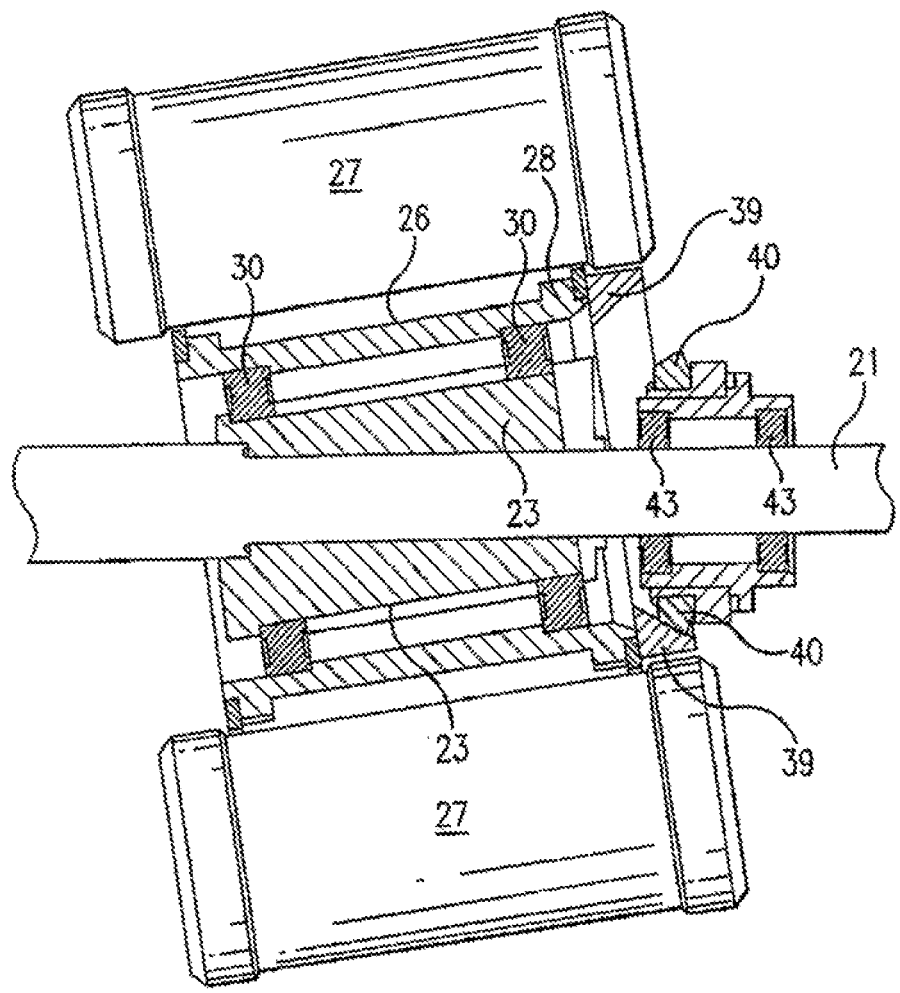
FIG. 16 is another embodiment of the stabilizer assembly of this invention using rubber wheels.
Figure 17:
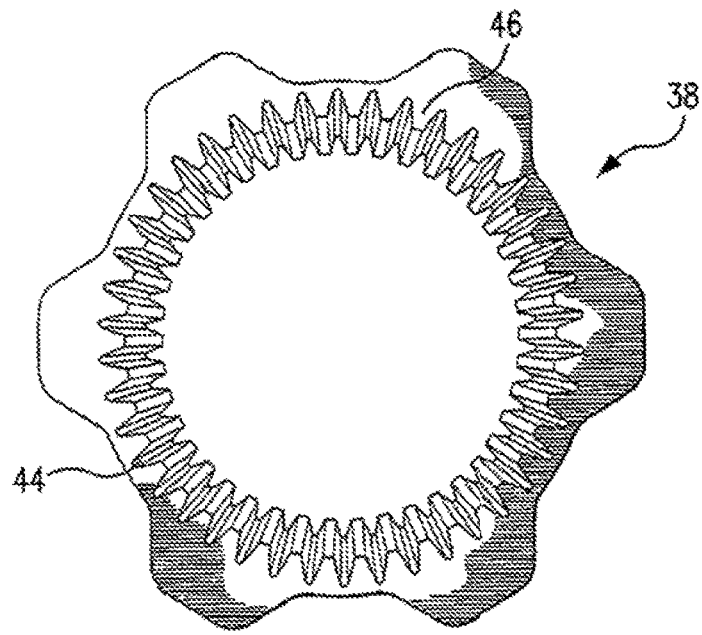
FIG. 17 is a full end view of a ring gear on this invention.
Figure 18:
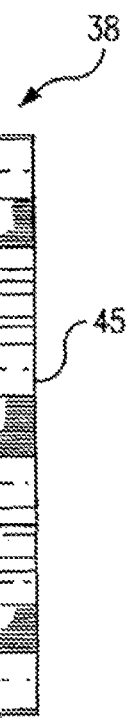
FIG. 18 is a full edge view of the ring gear of FIG. 17.
Figure 19:
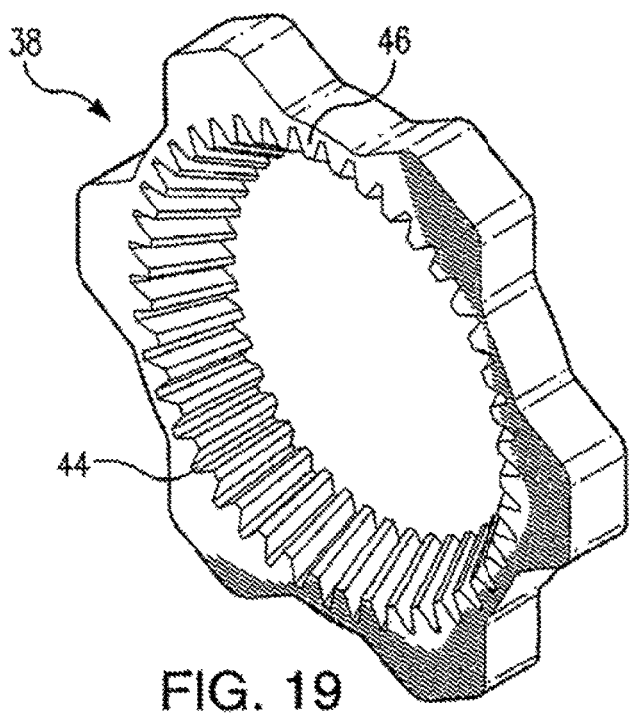
FIG. 19 is a view in perspective from the front, of the ring gear of FIG. 17.
Figure 20:
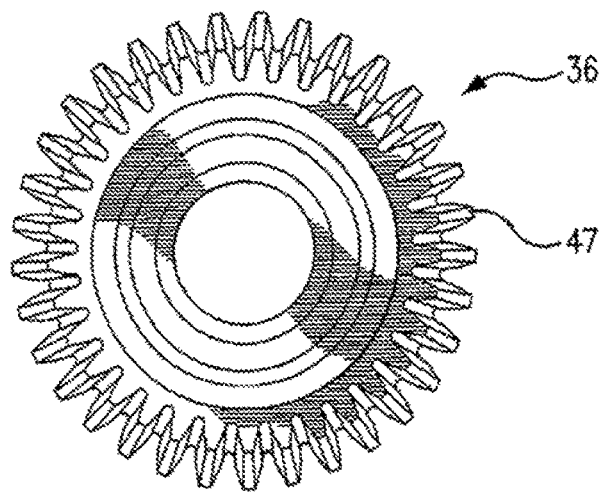
FIG. 20 is a full back view of a pinion gear on this invention.
Figure 21:
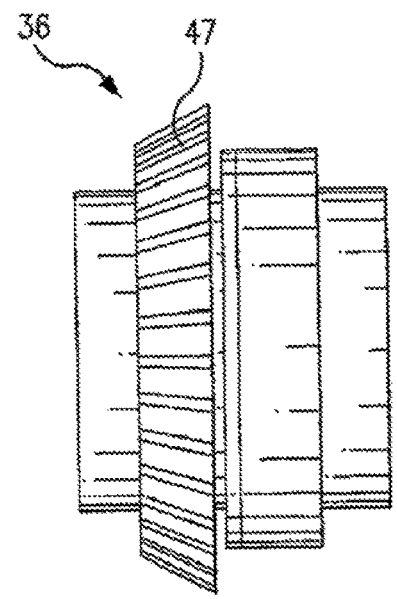
FIG. 21 is a full side view of the pinion gear of FIG. 20.
Figure 22:
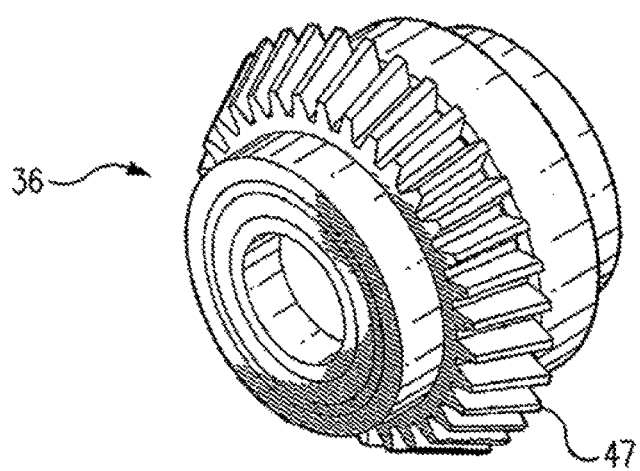
FIG. 22 is a full view in perspective of the back of the pinion gear of FIG. 20.

There is a mounted on the outside hub 28, a stabilizer assembly in one embodiment, consisting of a pinion gear 36 FIGS. 20, 21, and 22, and a ring gear 38, FIGS. 17, 18, and 19, and in another embodiment, a stabilizer ring 39 and a stabilizer wheel 40 (See FIG. 16).

There is rotatably mounted on the main drive shaft 16, adjacent to the stabilizer ring gear 38 (or stabilizer ring 39 in the event of another embodiment), a stabilizer housing 42. The stabilizer housing 42 contains internal bearings 43 adjacent to the main drive shaft 16. It should be noted that the pinion gear 36 surrounds the stabilizer housing 42 and from this position meshes with the ring gear 38. (See FIG. 12).

The ring gear 38 comprises an inward surface 44 and an outside surface 45. The inward surface 44 is comprised of a plurality of gear teeth 46, the number and shape of gear teeth 46 being matched to mesh with corresponding teeth on the adjacent pinion gear 36. It will be noted from FIGS. 17 and 19 that the gear teeth 46 slant forward within the ring gear 28.

Turning now to FIGS. 20, 21, and 22, there is shown a pinion gear 36 which operates in conjunction with the ring gear 38. Note that the teeth 47 on the pinion gear 36 are configured to mesh with the gear teeth 46 of the ring gear 38.

Figure 23:
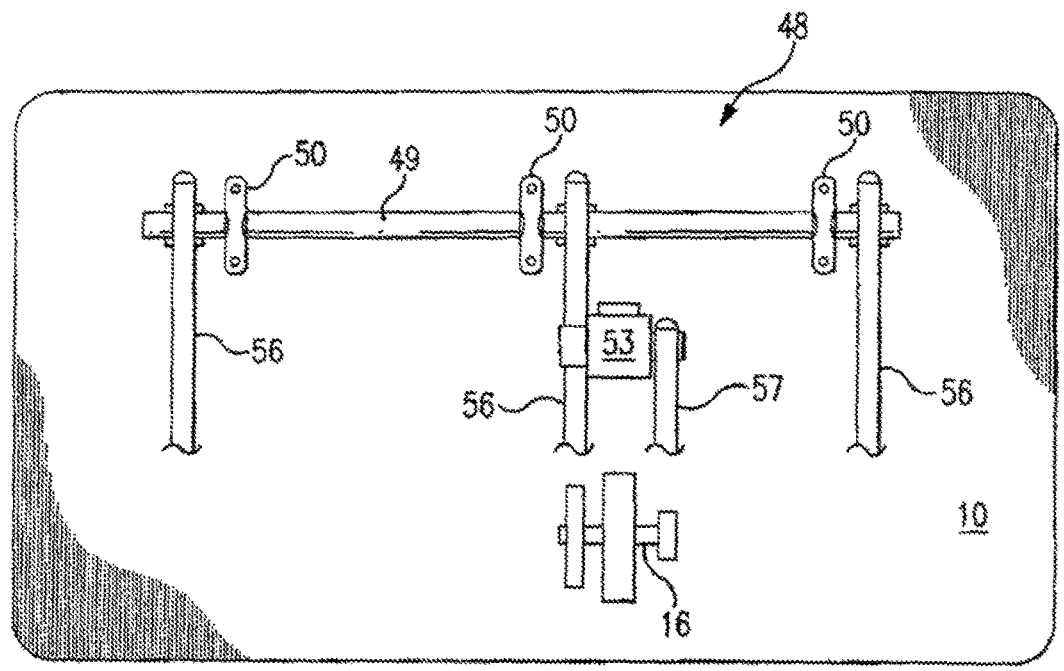
FIG. 23 is a top view of the secondary drive assembly mounted on the flat plate.
Figure 24:
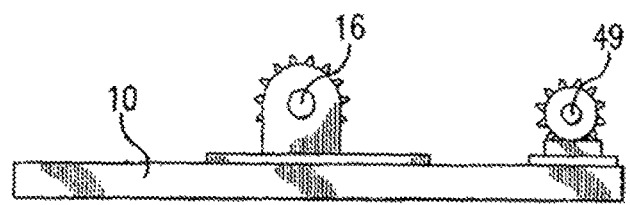
FIG. 24 is an end view of the drive assemblies of FIG. 23.

There is a stabilizer drive mechanism 48, best shown in FIGS. 2 and 23 and 24, that is comprised of a secondary drive shaft 49 that is surmounted on the non-stationary flat plate 10, near the backend of the plate 10. The secondary drive shaft 49 is mounted in secondary drive shaft mounts 50, three of which are shown in FIG. 23, said mounts 50 being mounted on the flat plate 10. The secondary drive shaft 49 has at least three first drive wheels, one near each near end of the secondary drive shaft 49 and one essentially centered on the secondary drive shaft 49.

The main drive shaft 16 has at least three second drive wheels being aligned with the second end first drive wheels on the secondary drive shaft 49. The centered first drive wheel is aligned with a third drive wheel mounted on a gear reducer 53 shown in FIG. 23. The gear reducer 53 is surmounted on the non-stationary flat plate 10 between the driven flywheel 9 and the secondary shaft 49. The gear reducer 53 has a fourth drive wheel mechanically connected to a third drive wheel by reducing gears (not shown). The fourth drive wheel and centered first drive wheel being connected by a drive link 56 shown in FIG. 23. There is a second drive link 57 connecting each first drive wheel with an aligned second drive wheel.

Figure 27:
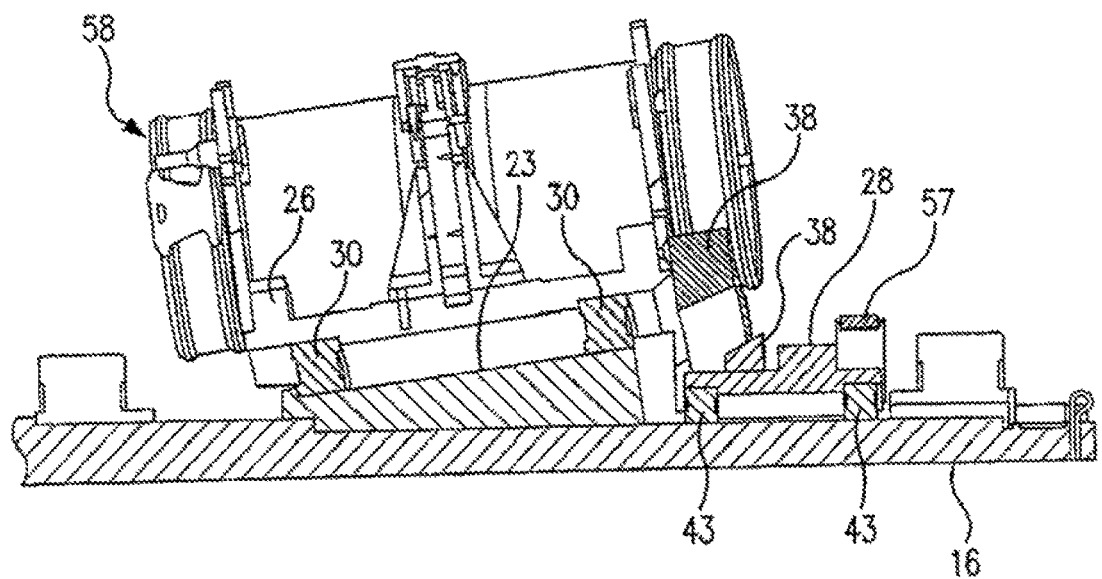
FIG. 27 is a partial enlarged view of the stabilizer assembly along line 27-27 of FIG. 28.

FIG. 27 is a side view of the canister 58 mounted in the canister carrier 26. This Figure shows an enlarged view of the mechanism for stabilization, namely, the cam 23, the bearings 30 on the cam, the stabilizer ring 38, the stabilizer hub 28, a drive link 57 which is a belt drive, the stabilizer bearing 43, and the main drive shaft 16. Canister sizes can range from 12 to 15 inches in length and from 4 to 8 inches in diameter.

In this manner of linking the drive wheels, in operation, the main drive shaft 16 moves in a counter clockwise rotation and the secondary drive shaft 49 for the stabilizer units moves in a clockwise rotation. Due to the gearing mechanism 53, the secondary drive shaft 49 moves much slower than the main drive shaft 16.

It is contemplated within the scope of this invention to substitute a synchronous drive unit for the secondary drive mechanism that drives the secondary shaft.

Figure 26:
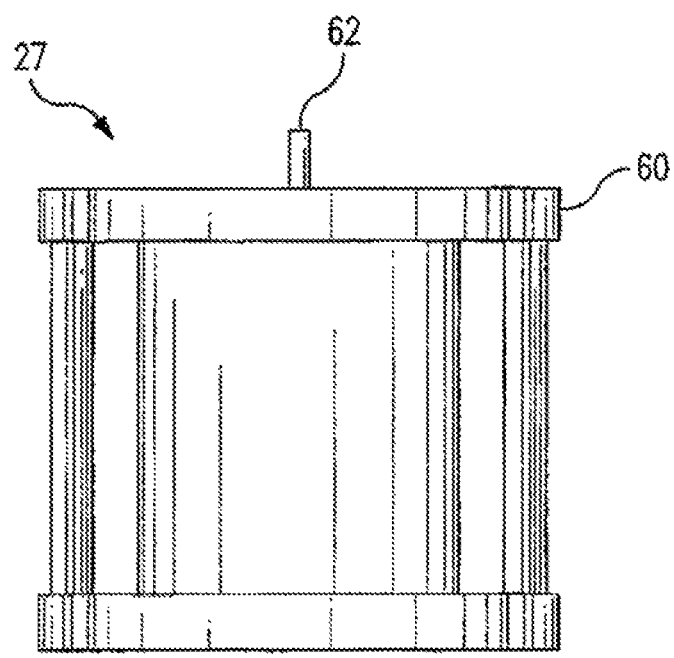
FIG. 26 is a full side view of one canister design of this invention.

FIG. 26 shown a full side view of one canister 27 design of this invention wherein there is shown the canister 27, the cap 60 and the atmosphere control valve 62.

Figure 28:
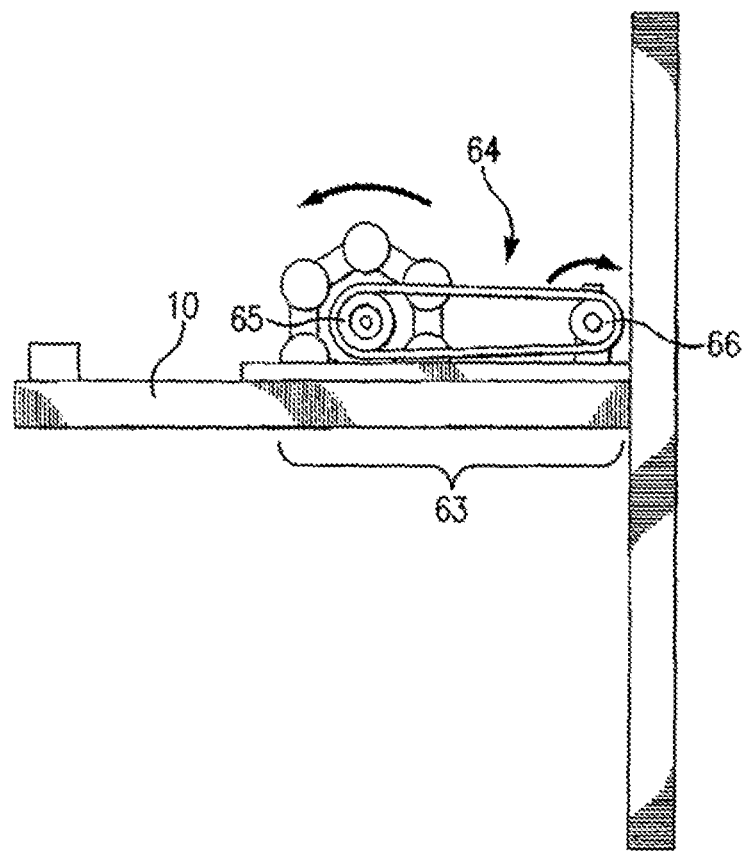
FIG. 28 is a full side view of a synchronous drive of this invention.

Turning now to another embodiment of a stabilizer drive mechanism of this invention, there is shown in FIG. 28 a full side view of a synchronous drive 63 mounted on the non-stationary plate 10. The synchronous drive 63 is comprised of a belt system comprising a drive belt 64 that is attached to a drive wheel 65 and linked to a second wheel 66, which is mounted on the secondary shaft 49 (shown in FIG. 1). It should be noted from the arrows in FIG. 28 that the main drive shaft 16 drives in a counter clockwise motion, and the secondary drive shaft 49 drives in a clockwise motion.

Figure 25A:
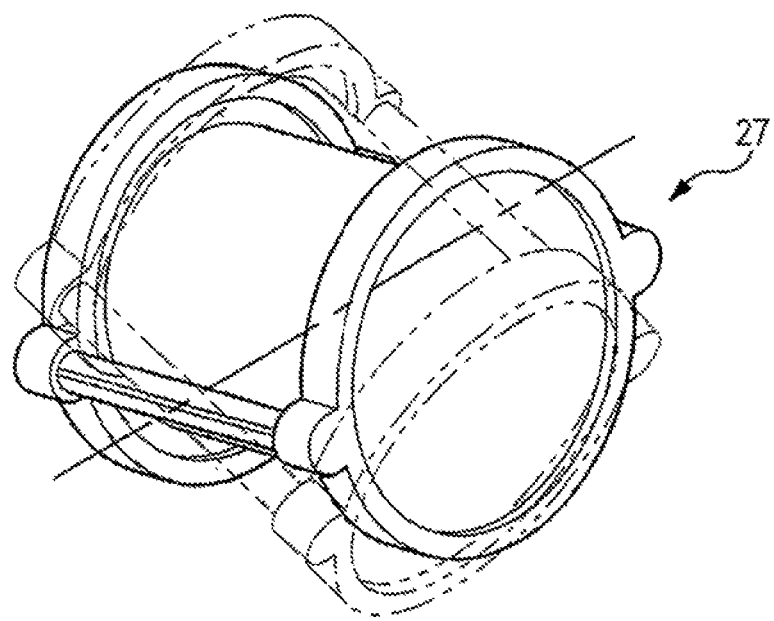
FIG. 25A is an illustration of the axis 1 orbital rotation of the canisters when the apparatus is in motion.
Figure 25B:
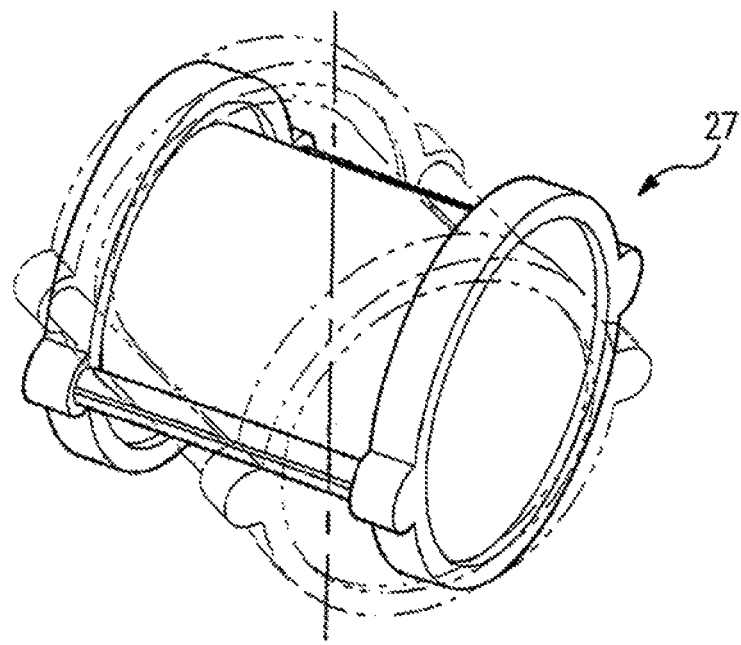
FIG. 25B is an illustration of the axis 2 orbital rotation of the canisters when the apparatus is in motion.
Figure 25C:
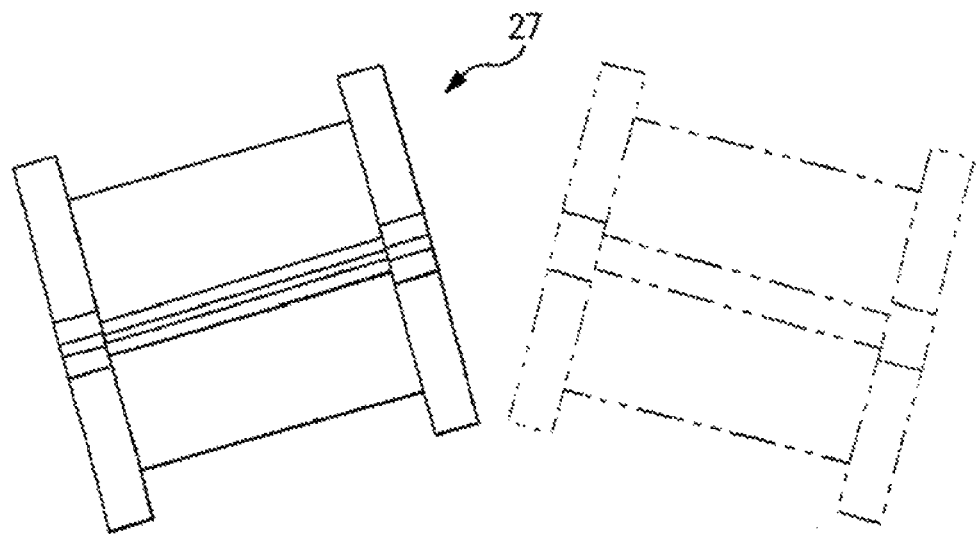
FIG. 25C is an illustration of the planar axis 2 translation and the planar axis 1 translation of the canisters when the apparatus is in motion.
Figure 25D:
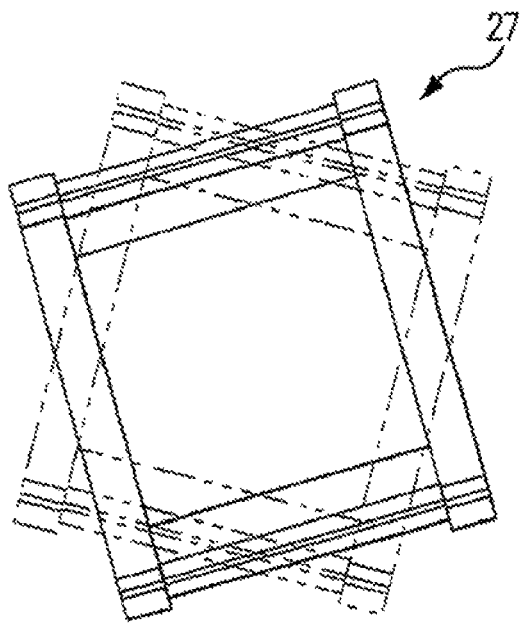
FIG. 25D is an illustration of the planar axis 3 translation of the canisters when the apparatus is in motion.

The apparatus 1 is designed to impart forces in three planes and in orbital planes, one, two, or three, simultaneously (see FIGS. 25A to 25D). FIG. 25A shows the axis 1 orbital rotation. FIG. 25B shows the axis 2 orbital rotation. FIG. 25C shows the planar axis 2 translation in the vertical direction and the planar axis 1 translation in the horizontal direction. FIG. 25D shows the planar axis 3 translation.

The apparatus acts on the media to translate it in all planes simultaneously. By doing so, the energy of the apparatus is converted into the stress state required to cause the exfoliation of the particulate material. Other methods of milling, grinding, or size reduction of particulates do not impart forces or translate the media in these planes simultaneously. Most typically, these machines affect only 2 or 3 planes, or e places and I orbital t most. The theory of these methods or machines is to move the media so that the media can do the work. This causes pulverization to occur. The operation of conventional machines does not create the correct stress environment to allow exfoliation to occur.

In addition to creating exfoliation via the shear forces, the present invention creates wear rate or deterioration on the media is minimized due to the machine doing the work and not the media. The apparatus of the instant invention moves the media so that the media and the apparatus act as one unit and are not disassociated.

The milling media is chosen so that it provides optimum mass and provides correct shear forces. The mass is determined by the specific gravity of the media. If the specific gravity becomes too large, the forces that occur as the media comes into contact with the particulate material will exceed the shear thresholds and becomes tensile or compressive in nature. Should the forces become tensile or compressive, pulverization occurs. If the specific gravity of the media becomes too small, the forces that occur as the media comes into contact with the particulate material will offer limited effect.

The shear forces are determined by the inter facial surface energy of the media. If the interfacial surface energy with respect to the material being exfoliated becomes too large the forces that occur as the media comes into contact with the particulate material will exceed the shear thresholds and become tensile or compressive in nature. The performance of the apparatus is optimized as the interfacial surface energy and the surface area (achieved via diameter) is optimized. Media of mixed diameter may be used. If the surface energy between the media and material being exfoliated is too low, the media slips on the surface of the material and does not apply sufficient shear to cause exfoliation.

In order for the machine and the media to act as one unit and create exfoliation, the cavity and the amount of fill of media in the cavity must be correct. The cavity must be filled in proportion to the length of movements created by the planar vectors. The performance of the apparatus is improved as the fill ratio, $L_{overall}$ to $L_{void}$ is optimized.

In the method of this invention, wherein the apparatus 1 is used, it is necessary to cause the shear forces (or energy) created to be high enough in the basal plane that fracture (potential energy increase) will predominately occur in those planes prior to fracture through tensile forces. Based on test results, the following best describes the conditions under which the apparatus should be operated.

The ratio of mass of media to mass of particulate should be in the range of 1:6 to 1:15; the height of media to height of canister should be 60 to 90%; the free space to canister displacement should be less than 40%; the specific gravity of the media should be from 1.05 to 1.38. Preferred for this apparatus and method is plastic media, although other known exfoliating media can be used as long as it fits the parameters of use in this invention, namely, the media is chosen to match the specific surface energy of the particulate. The actual operating time should be in the range of 45 minutes to about 1200 minutes.

The composition of matter that is a produced by this apparatus and method can be any particulate material, or any combination of particulate material. The preferred particulate material is one that has basal planes and exfoliates to form platelets. Preferred particulate matter for this method is graphite exfoliated into graphene nanoplatelets. The particulate material is preferred to be high surface area graphene nanoplatelets comprising particles ranging in size from 1 nanometer to 5 microns in lateral dimension and consisting of one to a few layers of graphene with a z-dimension ranging from 0.3 nanometers to 10 nanometers and exhibiting very high BET surface areas ranging from 200 to 1200 $m^2/g$. In some embodiments partially exfoliated particulate matter with a BET surface area from 30 to 200 $m^2/g$ may be produced.

The apparatus may be capable of containing one or multiple containers. It may provide for more than one centroid of movement from one driver motor.

The invention claimed is:

1. A method of exfoliating a particulate matter, said process comprising: a. providing an apparatus for mechanically exfoliating particulate material with a basal plane, said apparatus comprising in combination: i. a support frame; ii. a motor mount; iii. a motor mounted on said motor mount, said motor having a drive shaft, said drive shaft having a driven flywheel mounted thereon; iv. said support frame having a non-stationary flat plate surmounted thereon by mounted shock absorbers, said non-stationary flat plate having a front end and a back end, said non-stationary flat plate having rigidly surmounted thereon; v. a processor assembly comprising: a main drive shaft having two ends extending through drive shaft mounts, said main drive shaft comprising a flywheel between said ends of said main drive shaft; one or more cams on said main drive shaft, and a fastener on each end of said main drive shaft to maintain said main drive shaft in said drive shaft mounts; vi. a canister carrier configured for holding at least one canister mounted on each cam, said canister carrier comprising: a hub, wherein said hub has an external surface mounting a cradle and an internal flat surface supporting bearings; vii. a stabilizer drive mechanism, said stabilizer drive mechanism comprising: a ring gear driven by a pinion gear, a secondary drive shaft surmounted on said non-stationary flat plate, said secondary drive shaft being mounted in secondary drive shaft mounts, surmounted on said non-stationary flat plate; said secondary drive shaft having at least three first drive wheels; viii. a drive link connecting each said first drive wheel with an aligned second drive wheel; b. providing a particulate material and placing said particulate material in said canister of said apparatus; c. providing an exfoliating media and placing said exfoliating media in said canister of said apparatus; d. sealing said canister; e. operating said apparatus according to a set of predetermined operating parameters to exfoliate said particulate material comprising a ratio of mass of said exfoliating media to mass of said particulate material in said canister, a height of said exfoliating media in said canister to a height of said canister, a ratio of free space in said canister to a canister displacement; and an operating time; f. removing said exfoliated particulate material from said canister after said set of predetermined operating parameters has been met.

2. The method as claimed in claim 1 wherein the ratio of mass of exfoliating media to mass of particulate material in said canister is 1:6 to 1:15.

3. The method as claimed in claim 1 wherein the height of exfoliating media in said canister to the height of said canister is 60 to 90%.

4. The method as claimed in claim 1 wherein the ratio of free space in said canister to the canister displacement is less than 40%.

5. The method as claimed in claim 1 wherein the specific gravity of the exfoliating media is from 1.05 to 1.38.

6. The method as claimed in claim 1 wherein said exfoliating media is plastic material.

7. The method as claimed in claim 1 wherein the operating time is in the range of 45 minutes to about 1200 minutes.

8. A method of exfoliating a particulate matter, said process comprising: a. providing an apparatus, said apparatus comprising in combination: i. a support frame; ii. a motor mount; iii. a motor mounted on said motor mount, said motor having a drive shaft, said drive shaft having a driven flywheel mounted thereon; iv. said support frame having a non-stationary flat plate surmounted thereon by mounted shock absorbers, said non-stationary flat plate having a front end and a back end, said non-stationary flat plate having rigidly surmounted thereon; v. a processor assembly comprising: a main drive shaft having two ends extending through drive shaft mounts, said main drive shaft comprising a flywheel between said ends of said main drive shaft; one or more cams on said main drive shaft, and a fastener on each end of said main drive shaft to maintain said main drive shaft in said drive shaft mounts; vi. a canister carrier configured for holding at least one canister mounted on each cam, said canister carrier comprising: a hub, wherein said hub has an external surface mounting a cradle and an internal flat surface supporting bearings; vii. a stabilizer drive mechanism, said stabilizer drive mechanism comprising: at least one synchronous drive mechanism; a secondary drive shaft surmounted on said non-stationary flat plate, said secondary drive shaft being mounted in secondary drive shaft mounts, surmounted on said non-stationary flat plate; said secondary drive shaft having at least three first drive wheels; viii. a drive link connecting each said first drive wheel with an aligned second drive wheel; b. providing a particulate material and placing said particulate material in said canister of said apparatus; c. providing an exfoliating media and placing said exfoliating media in said canister of said apparatus; d. sealing said canister; e. operating said apparatus according to a set of predetermined operating parameters to exfoliate said particulate material comprising a ratio of mass of said exfoliating media to mass of said particulate material in said canister, a height of said exfoliating media in said canister to a height of said canister, a ratio of free space in said canister to a canister displacement; and an operating time; f. removing said exfoliated particulate material from said canister after said set of predetermined operating parameters has been met.

9. The method as claimed in claim 8 wherein the ratio of mass of exfoliating media to mass of particulate material in said canister is 1:6 to 1:15.

10. The method as claimed in claim 8 wherein the height of exfoliating media in said canister to the height of said canister is 60 to 90%.

11. The method as claimed in claim 8 wherein the ratio of free space in said canister to the canister displacement is less than 40%.

12. The method as claimed in claim 8 wherein the specific gravity of said exfoliating media is from 1.05 to 1.38.

13. The method as claimed in claim 8 wherein said exfoliating media is plastic material.

14. The method as claimed in claim 8 wherein the operating time is in the range of 45 minutes to about 1200 minutes.

* * * * *